US010487476B2

(12) United States Patent
Kumagai et al.

(10) Patent No.: US 10,487,476 B2
(45) Date of Patent: Nov. 26, 2019

(54) CONSTRUCTION MACHINE

(71) Applicant: Hitachi Construction Machinery Co., Ltd., Taito-ku, Tokyo (JP)

(72) Inventors: Hiroshi Kumagai, Ryugasaki (JP); Kazuhiko Mizoguchi, Ishioka (JP); Masao Kariya, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 99 days.

(21) Appl. No.: 15/757,446

(22) PCT Filed: Sep. 5, 2016

(86) PCT No.: PCT/JP2016/075991
§ 371 (c)(1),
(2) Date: Mar. 5, 2018

(87) PCT Pub. No.: WO2017/061207
PCT Pub. Date: Apr. 13, 2017

(65) Prior Publication Data
US 2018/0245310 A1    Aug. 30, 2018

(30) Foreign Application Priority Data
Oct. 6, 2015    (JP) .................................. 2015-198416

(51) Int. Cl.
*E02F 9/08*    (2006.01)
*E02F 9/18*    (2006.01)
(Continued)

(52) U.S. Cl.
CPC ............ *E02F 9/0866* (2013.01); *B60K 11/04* (2013.01); *E02F 3/32* (2013.01); *E02F 3/325* (2013.01);
(Continued)

(58) Field of Classification Search
CPC .............................. E02F 9/0866; E02F 9/0883
See application file for complete search history.

(56) References Cited

U.S. PATENT DOCUMENTS 6,922,990 B2 *   8/2005  Naruse ................... E02F 3/325
                                                                60/414
7,451,843 B2 *  11/2008  Nakashima ............ B60K 11/08
                                                                180/68.1
(Continued)

FOREIGN PATENT DOCUMENTS

JP    2009-29183 A    2/2009
JP    2009-138526 A    6/2009
(Continued)

OTHER PUBLICATIONS

International Search Reported (PCT/ISA/210) issued in PCT Application No. PCT/JP2016/075991 dated Nov. 29, 2016 with English translation (four (4) pages).
(Continued)

*Primary Examiner* — Nicole T Verley
(74) *Attorney, Agent, or Firm* — Crowell & Moring LLP

(57) ABSTRACT

A urea water tank (27) is formed as a box body that includes a rear inclined surface (28A) that inclines so as to be parallel with a left inclined surface (7C) of a counterweight (7), a front inclined surface (28B) that inclines with a space being left apart from the rear inclined surface (28A) and in substantially parallel with the rear inclined surface (28A) and a front surface (28C) that is formed on front ends of the rear inclined surface (28A) and the front inclined surface (28B) and is formed into a flat surface that is parallel with a left-right direction of an upper revolving body (4). The rear inclined surface (28A) of the urea water tank (27) is disposed along and facing the left inclined surface (7C) of the counterweight (7) and the front inclined surface (28B) is disposed with a gap being left apart from and facing the heat
(Continued)

exchanger (9). A cooling air guide passage (33) through which cooling air flows is formed between the heat exchanger (9) and the front inclined surface (28B) of the urea water tank (27).

5 Claims, 11 Drawing Sheets

(51) Int. Cl.
  *B60K 11/04* (2006.01)
  *E02F 3/32* (2006.01)
  *F01N 3/20* (2006.01)
  *F01P 5/04* (2006.01)
  *F01P 11/10* (2006.01)
  *F01N 3/10* (2006.01)

(52) U.S. Cl.
  CPC .......... *E02F 9/0808* (2013.01); *E02F 9/0883* (2013.01); *E02F 9/0891* (2013.01); *E02F 9/18* (2013.01); *F01N 3/2066* (2013.01); *F01P 5/04* (2013.01); *F01P 11/10* (2013.01); *F01N 3/103* (2013.01); *F01N 2610/02* (2013.01); *F01N 2610/14* (2013.01); *F01N 2610/1406* (2013.01)

(56) References Cited

U.S. PATENT DOCUMENTS

| | | | |
|---|---|---|---|
| 8,037,963 B2* | 10/2011 | Nishimura | E02F 9/2292 |
| | | | 180/291 |
| 9,719,233 B1* | 8/2017 | Abe | E02F 9/18 |
| 2010/0266458 A1 | 10/2010 | Takeshita et al. | |
| 2013/0294876 A1 | 11/2013 | Kobayashi et al. | |

FOREIGN PATENT DOCUMENTS

| | | |
|---|---|---|
| JP | 2012-144955 A | 8/2012 |
| JP | 2015-148185 A | 8/2015 |

OTHER PUBLICATIONS

Japanese-language Written Opinion (PCT/ISA/237) issued in PCT Application No. PCT/JP2016/075991 dated Nov. 29, 2016 (three (3) pages).

* cited by examiner

CONSTRUCTION MACHINE

TECHNICAL FIELD

The present invention relates to a construction machine such as a hydraulic excavator and the like that is equipped with, for example, a urea water tank that stores a urea water solution to be supplied to a NOx purifying device that purifies nitrogen oxides in an exhaust gas.

BACKGROUND ART

Generally, the hydraulic excavator as the construction machine is configured of a self-propelled lower traveling body, an upper revolving body that is rotatably mounted on the lower traveling body and a front device that is provided on the upper revolving body so as to be capable of moving upward/downward.

The upper revolving body is configured of a revolving frame that forms a support structure body, a counterweight that is provided on the rear side of the revolving frame so as to extend in a left-right direction of the revolving frame and keeps weight balance with the front device, an engine that is located on the front side of the counterweight and is mounted on the revolving frame in a horizontally installed state extending in the left-right direction, a cooling fan that is provided on one side in the left-right direction of the engine and, rotates using the engine as a power source and thereby sucks external air as cooling air, a heat exchanger such as a radiator, an oil cooler and the like that is located closer to an upstream side of a flowing direction of the cooling air than the cooling fan, is provided so as to face the cooling fan and cools a fluid with the cooling air and an exterior cover that includes a side surface cover part that faces the heat exchanger in the flowing direction of the cooling air and is equipped with external air inlet ports and atop surface cover part that covers the upper sides of the engine, and the heat exchanger.

A diesel engine is used as the engine of the hydraulic excavator. It is said that this diesel engine emits a large amount of nitrogen oxides (hereinafter, refer as NOx) and the like. Thus, there is a NOx purifying device adapted to purify NOx as a post-treatment device for the exhaust gas from the diesel engine. This NOx purifying device is configured of, for example, a urea water selective reduction catalyst that is provided in an exhaust pipe of the engine and removes the nitrogen oxides in the exhaust gas and a urea water injection valve that injects the urea water solution (hereinafter, refer as urea water) as a reducing agent to the upstream side of the urea water selective reduction catalyst. Thereby, a urea water tank adapted to store the urea water that is the reducing agent is provided on the hydraulic excavator that is equipped with the exhaust gas post-treatment device for the exhaust gas.

Here, there are small-type hydraulic excavators called an ultra-small revolving type, and a rearward ultra-small revolving type that are suited for work in a narrow work site in recent hydraulic excavators. In these small revolving type hydraulic excavators, an upper revolving body is miniaturized in such a manner that the upper revolving body is able to substantially revolve in a vehicle width of a lower traveling body thereof.

Therefore, since an installation space on the revolving frame is reduced in the small revolving-type small-type hydraulic excavator, apart on the revolving frame is brought into a state of being very congested with various kinds of devices. On the other hand, it becomes necessary for the urea water tank to have a large capacity that allows sufficient storage of the urea water. In addition, it is necessary to install the urea water tank at a position within easy reach from the outside so as to make performance easily of water supply work possible. Further, since the urea water is liable to deteriorate when a temperature rises above, for example, 60° C., it is desirable to install the urea water tank on a place that is spaced a part from the engine and the like that is the heat source and where air flows.

Accordingly, in the hydraulic excavator according to Patent Document 1, it is configured such that a heat exchanger upstream room that is located on the upstream side of the cooling air flowing direction of the heat exchanger and is surrounded by the revolving frame, the heat exchanger, the counterweight, the exterior cover is provided and the urea water tank is disposed in this heat exchanger upstream room.

PRIOR ART DOCUMENT

Patent Document

Patent Document 1: Japanese Patent Laid-Open No. 2012-144955 A

SUMMARY OF THE INVENTION

Here, in the hydraulic excavator according to Patent Document 1, the urea water tank is disposed in the heat exchanger upstream room located on the upstream side of the cooling air flowing direction of the heat exchanger. In this case, since the urea water tank blocks part of a passage through which the cooling air flows toward the heat exchanger, there is a problem that a fluid cooling performance by the heat exchanger is lowered.

The present invention has been made in view of the above-described problem of the conventional art and an object of the present invention is to provide a construction machine that makes it possible to efficiently cool the fluid by the heat exchanger even in a case where the urea water tank is disposed on the upstream side of the cooling air flowing direction of the heat exchanger.

The construction machine according to the present invention comprising: a self-propelled lower traveling body; an upper revolving body mounted rotatably on the lower traveling body; and a front device provided capable of moving upward/downward on the upper revolving body to be, wherein the upper revolving body including: a revolving frame forming a support structure body; a counterweight provided on a rear side of the revolving frame so as to extend in a left-right direction of the revolving frame and keeps weight balance with the front device; an engine located on a front side of the counterweight and provided in a horizontally placed state on the revolving frame, extending in a left-right direction; a cooling fan provided on one side in a left-right direction of the engine and suctioning an outside air as a cooling air by rotating with the engine as a power source; a heat exchanger located closer to an upstream side in a flow direction of the cooling air than the cooling fan and provided by facing the cooling fan and cooling a fluid by the cooling air; an exterior cover including a side surface cover part that faces the heat exchanger in the flowing direction of the cooling air and is equipped with external air inlet ports and a top surface cover part that covers the upper sides of the engine and the heat exchanger; a heat exchanger upstream room located on the upstream side in the flowing direction of the cooling air of the heat exchanger and surrounded by the revolving frame, the counterweight, the heat exchanger, and the exterior cover; and a urea water tank that is provided so as to be located in the heat exchanger upstream room and stores urea water that is a reducing agent, characterized in that: an inclined surface that inclines toward the heat exchanger upstream room is formed on a front surface side of the counterweight at least on one side in the left-right direction, the urea water tank is formed as a box body that includes a rear inclined surface that inclines so as to be parallel with the inclined surface of the counterweight, a front inclined surface that inclines with a space being left apart from the rear inclined surface and in substantially parallel with the rear inclined surface, and a front surface that is formed on front ends of the rear inclined surface and the front inclined surface and is formed into a flat surface that is parallel with the left-right direction of the upper revolving body, the rear inclined surface of the urea water tank is disposed along and facing the inclined surface of the counterweight, the front inclined surface of the urea water tank is disposed with a gap being left apart from and facing the heat exchanger, and a cooling air guide passage through which the cooling air flows is formed between the heat exchanger and the front inclined surface of the urea water tank by utilizing the gap between the heat exchanger and the front inclined surface.

According to the present invention, it is possible to efficiently cool the fluid by the heat exchanger even in a case where the urea water tank is disposed on the upstream side of the cooling air flowing direction of the heat exchanger.

MODE FOR CARRYING OUT THE INVENTION

Hereinafter, description will be made in detail in accordance with FIG. 1 to FIG. 11 by giving an ultra-small revolving type hydraulic excavator with a cab being mounted by way of example as a representative example of a construction machine according to an embodiment of the present invention.

Figure 1:
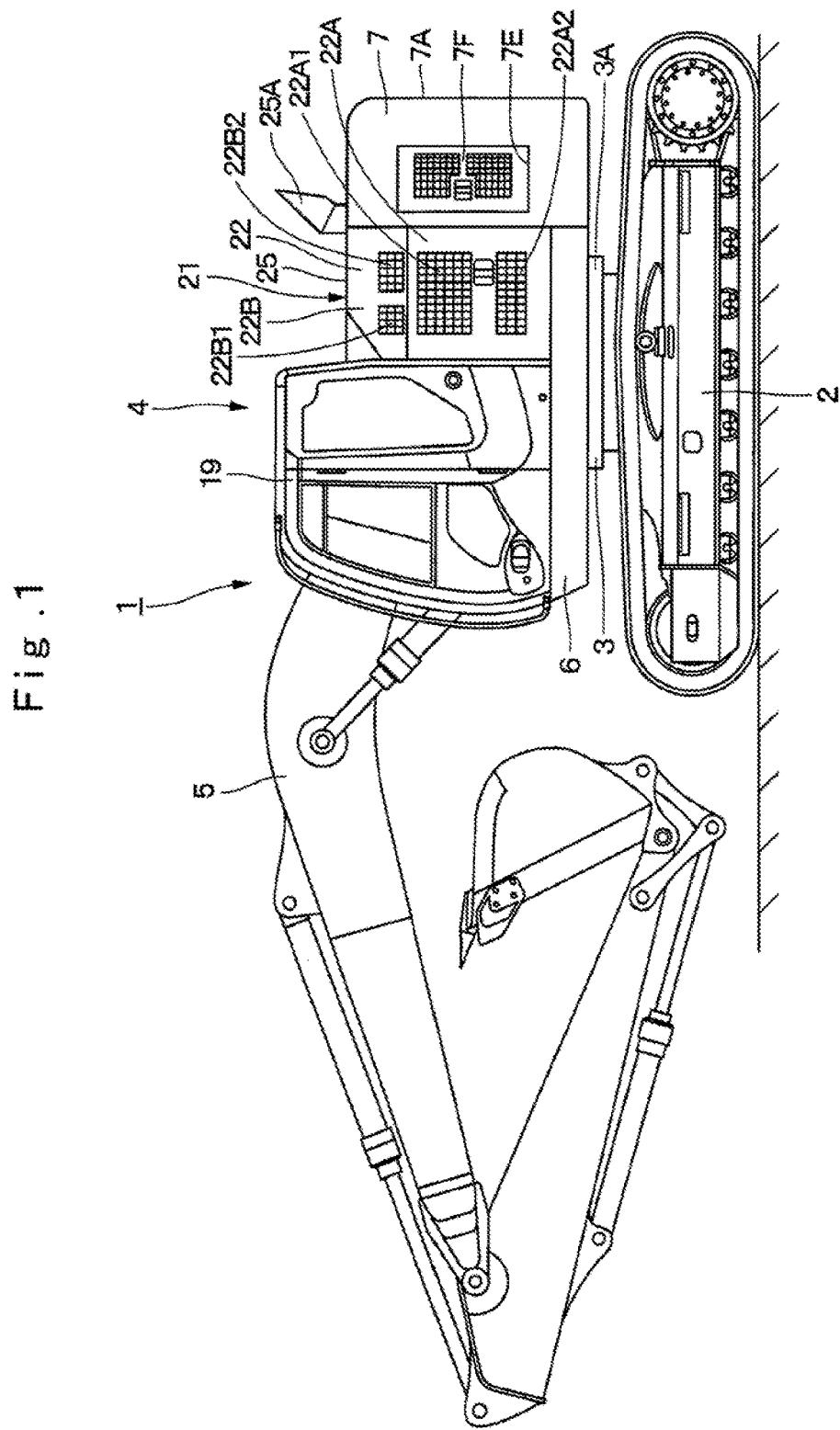
FIG. 1 is a front view showing a hydraulic excavator according to an embodiment of the present invention.
Figure 2:
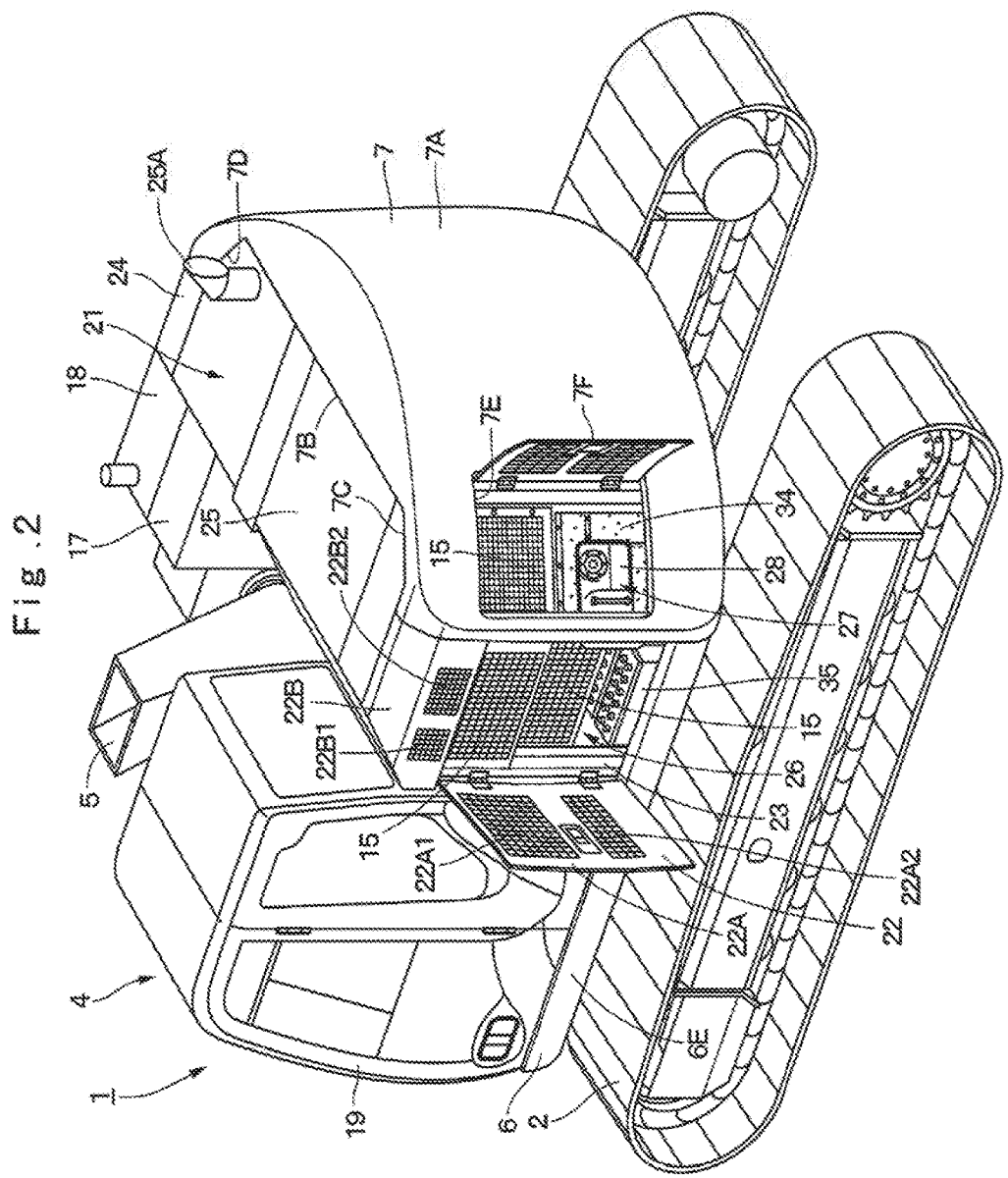
FIG. 2 is a perspective view showing the hydraulic excavator in which part of a front device is omitted from the left rear side.

A hydraulic excavator 1 is configured of a crawler type construction machine in FIG. 1, FIG. 2. This hydraulic excavator 1 is configured of a self-propelled crawler mounted type lower traveling body 2, an upper revolving body 4 that is rotatably mounted on the lower traveling body 2 via a revolving device 3 and a front device 5 that is provided on the front side in a front-rear direction of the upper revolving body 4 to be capable of moving upward/downward and performs earth and sand excavation and the like.

Here, the revolving device 3 is configured of including a swing circle 3A (see FIG. 1) that is provided between the lower traveling body 2 and the upper revolving body 4 (a revolving frame 6 which will be described later) as a large-diameter bearing structure body and a revolving motor 3B that revolves and drives the upper revolving body 4 with a center O (shown in FIG. 3) of the swing circle 3A being set as a revolving center. A center joint 3C adapted to make a pressure oil flow between the lower traveling body 2 and the upper revolving body 4 is disposed on this revolving center O.

The upper revolving body 4 has a left-right direction width dimension that is substantially equal to a vehicle width of the lower traveling body 2 and a rear surface of a counterweight 7 is formed into a substantially circular shape in a plane view so as to fit in a virtual circle (not shown) of a revolving radius centering on the revolving center O. Thereby, the hydraulic excavator 1 is configured as a rearward ultra-small revolving type hydraulic excavator in which an outer peripheral surface 7A of the counterweight 7 that will be described later substantially fits in the vehicle width of the lower traveling body 2 when the upper revolving body 4 revolves on the lower traveling body 2 centering on the revolving center O.

Figure 3:
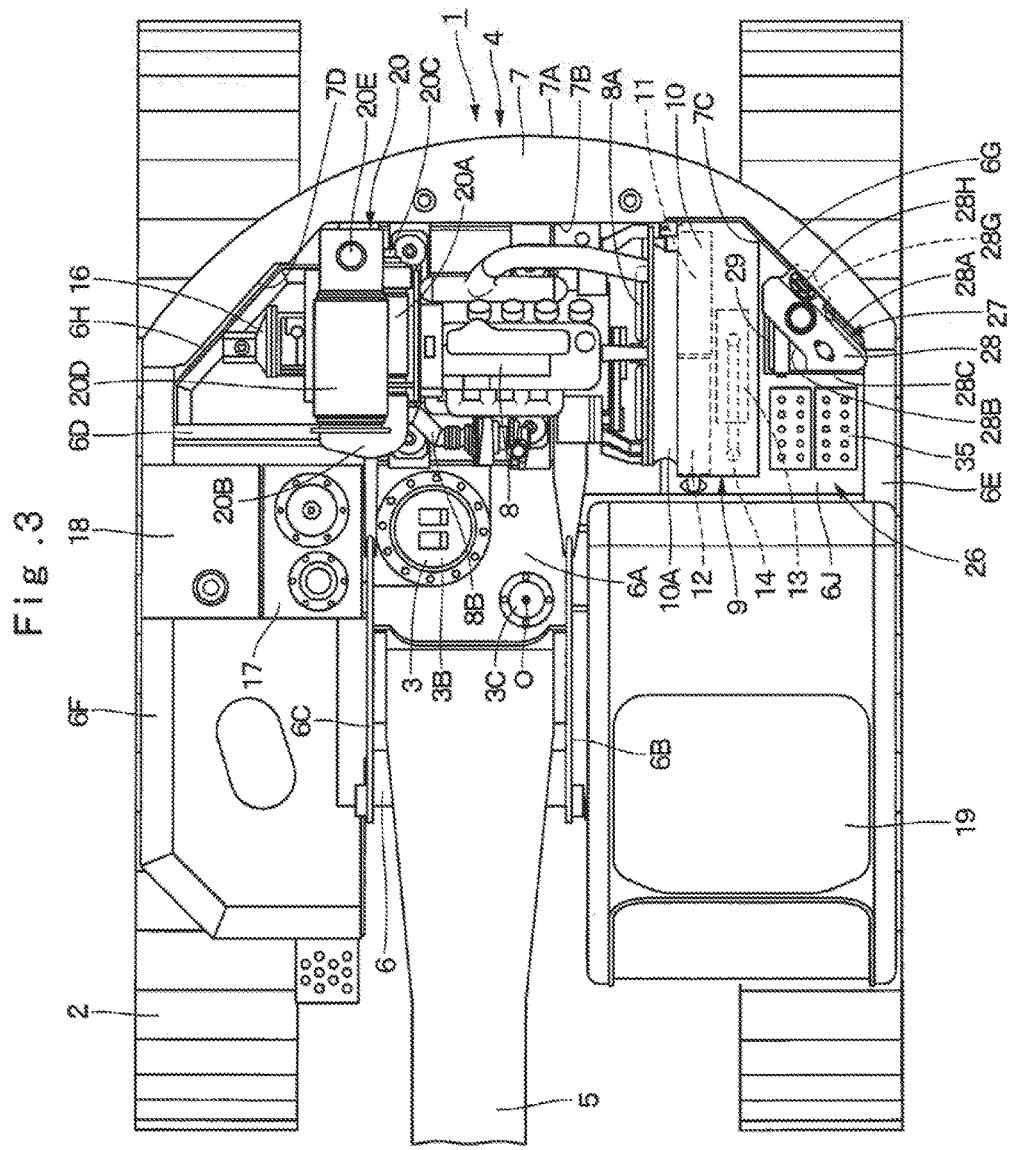
FIG. 3 is a plan view showing the hydraulic excavator in which the part of the front device is omitted in a state where an exterior cover is omitted.
Figure 4:
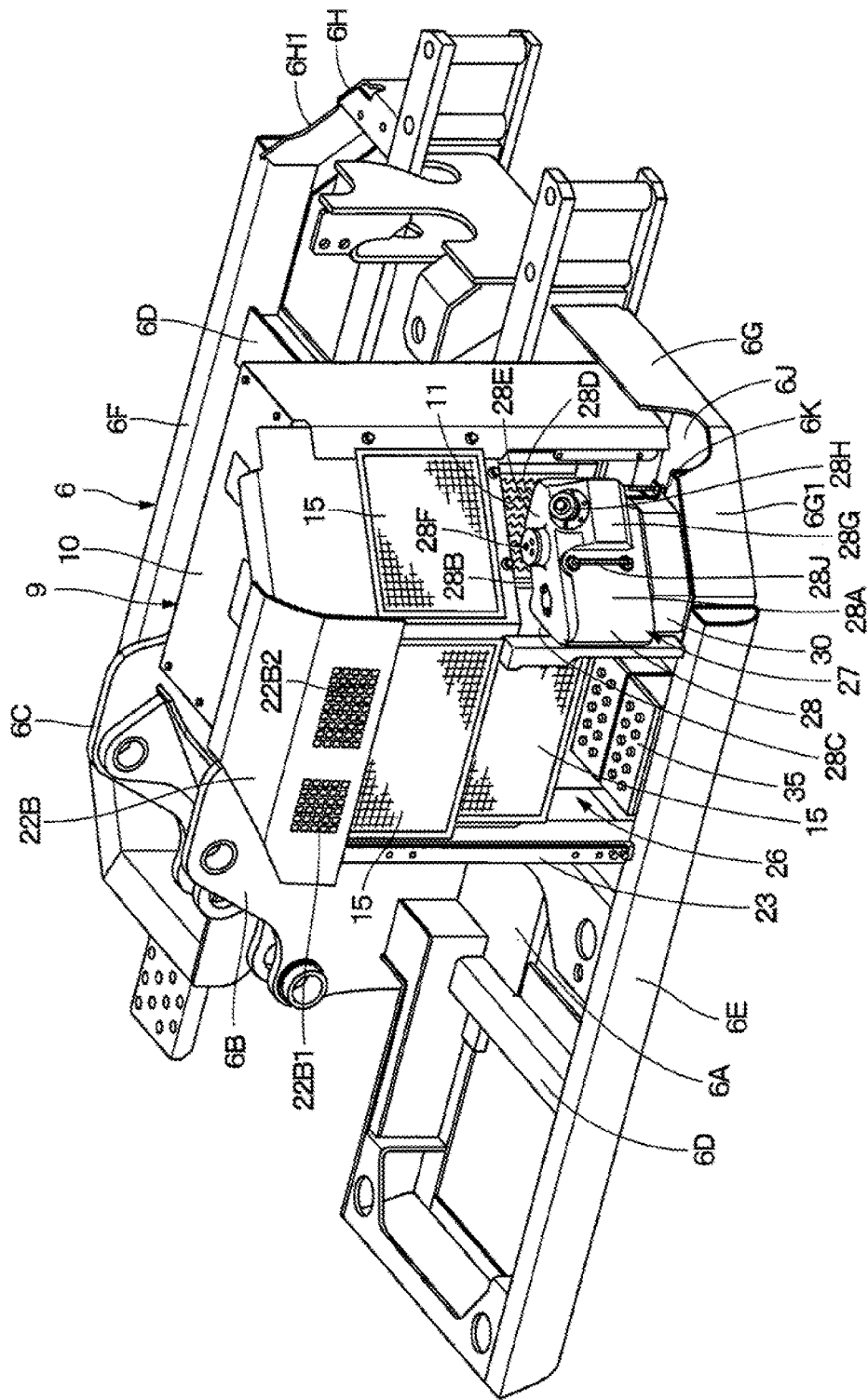
FIG. 4 is a perspective view showing a revolving frame, a heat exchanger and a urea water tank from the left rear side.

The revolving frame 6 forms a support structure body of the upper revolving body 4. As shown in FIG. 3, FIG. 4, the revolving frame 6 is configured of a bottom plate 6A that is composed of a thick steel plate and the like that extends in the front-rear direction, a left vertical plate 6B and a right vertical plate 6C that are disposed upright on the bottom plate 6A and extend in the front-rear direction leaving a predetermined interval in a left-right direction, a plurality of extension beams 6D that extend from the respective vertical plates 6B, 6C outward in the left-right direction and are arranged leaving a predetermined interval in the front-rear direction, and a left side frame 6E and a right side frame 6F that are located on the outer sides in the left-right direction, are attached to leading ends of the respective extension beams 6D and extend in the front-rear direction.

Here, a left rear part beam 6G that is located on the rear part side that faces the counterweight 7 and connects the left vertical plate 6B with the left side frame 6E and a right rear part beam 6H that is located on the rear part side that faces the counterweight 7 and connects the right vertical plate 6C with the right side frame 6F are provided on the revolving frame 6. This left rear part beam 6G has its a left-side part on the outer side formed as an inclined part 6G1 that inclines diagonally forward so as to run along a left inclined surface 7C of the counterweight 7. On the other hand, the right rear part beam 6H has its a right-side part formed as an inclined part 6H1 that inclines diagonally forward so as to run along a right inclined surface 7D of the counterweight 7.

Figure 5:
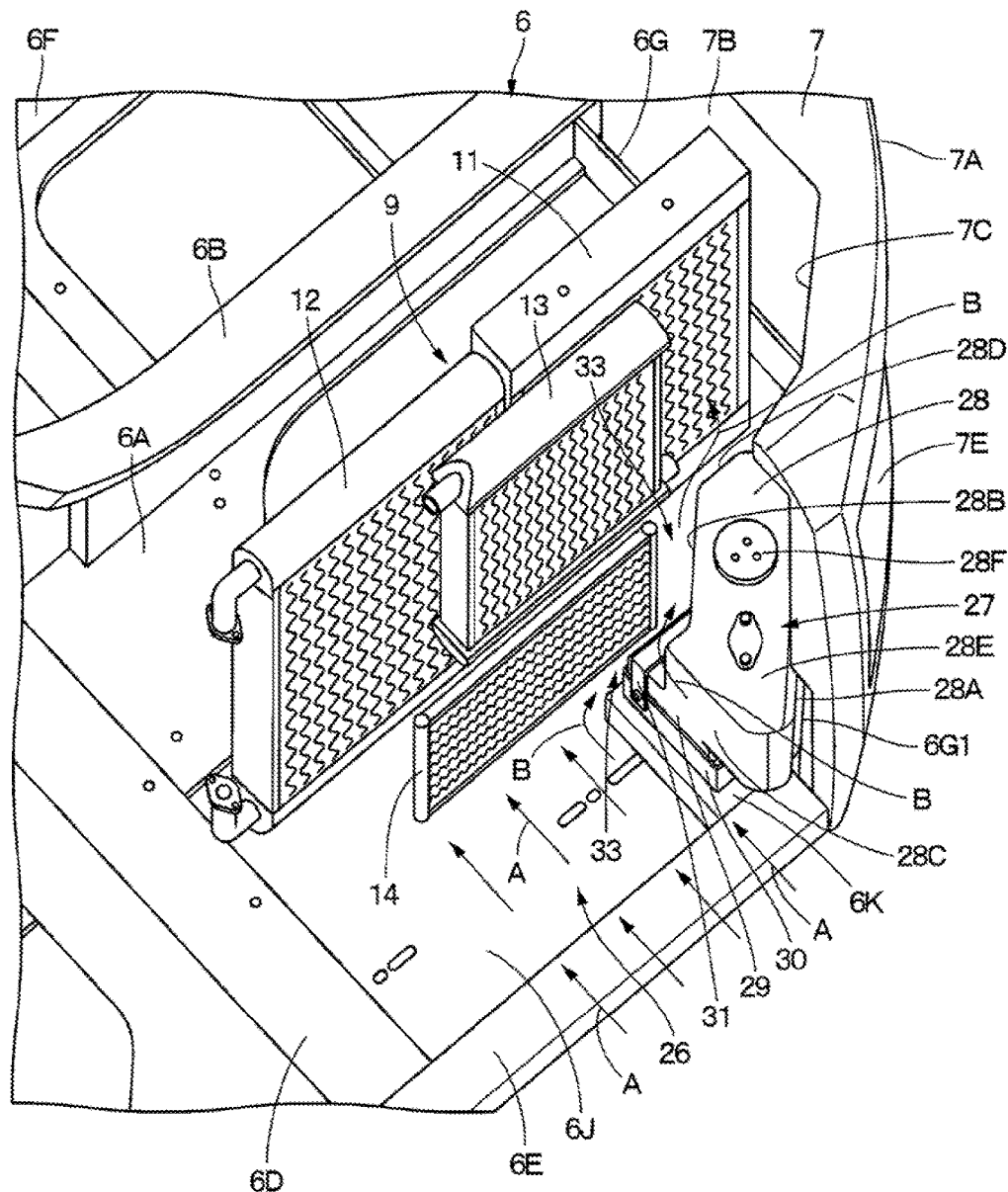
FIG. 5 is an essential part enlarged perspective view showing an arrangement relation among a counterweight, the heat exchanger and the urea water tank together with the revolving frame.
Figure 8:
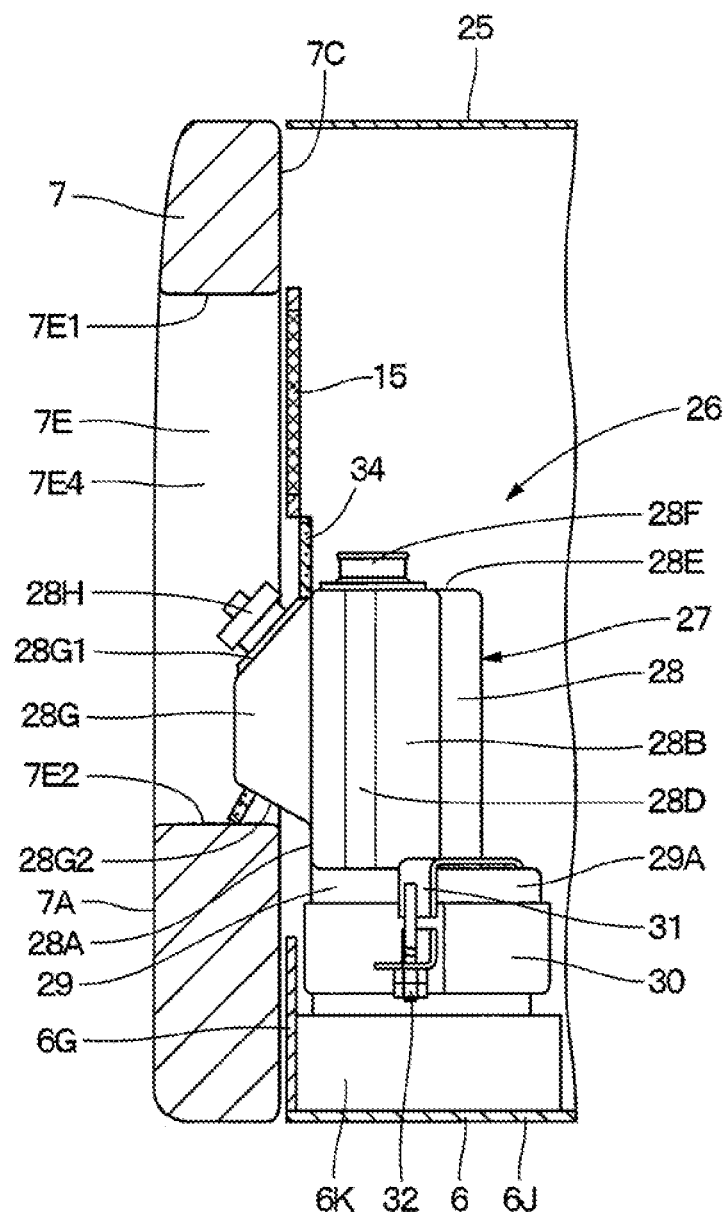
FIG. 8 is a sectional view showing an arrangement relation between the maintenance opening in the counterweight and the urea water tank seen from an arrow VIII-VIII direction in FIG. 7.

Further, as shown in FIG. 5, FIG. 8 and the like, an undercover 6J is provided on a left rear part of the revolving frame 6. This undercover 6J is formed as a substantially flat plate body and closes a lower surface of a heat exchanger upstream room 26 that will be described later. The undercover 6J is the one to which a heat exchanger 9, a urea water tank 27 and the like that will be described later are to be attached and a tank mounting base 6K that is located on a corner of a left rear part positioned in the vicinity of the inclined part 6G1 of the left rear part beam 6G and to which the urea water tank 27 (a bracket 30) is to be attached is provided thereon.

As shown in FIG. 3, the counterweight 7 is provided on the rear side of the revolving frame 6. This counterweight 7 is adapted to keep weight balance with the front device 5 and is formed as a heavy article a rear surface of which is in the form of an arc shape. The counterweight 7 is disposed at a position close to the revolving center O in such a manner that the rear side of the upper revolving body 4 substantially fits in the vehicle width of the lower traveling body 2 even in revolving operation.

The counterweight 7 is formed in such a manner that when the upper revolving body 4 is operated so as to revolve, a revolving radius by this upper revolving body 4 is reduced. Specifically, the counterweight 7 has the arc-shaped outer peripheral surface 7A by bending the both sides in the left-right direction forward and is disposed closely to the front side near the revolving center O of the revolving frame 6 in this shape.

In addition, the front surface side of the counterweight 7 is configured of a front center surface 7B that is located at the center in the left-right direction and extends substantially flat in the left-right direction, the left inclined surface 7C that inclines forward from a left end of the front center surface 7B toward the heat exchanger upstream room 26 that will be described later and the right inclined surface 7D that inclines forward from a right end of the front center surface 7B toward a fuel tank 18 that will be described later.

Here, as shown in FIG. 1, FIG. 2, a maintenance opening 7E through which maintenance such as work of supplying a urea water solution (hereafter referred to as urea water) and the like is performed is opened outward in a left-side part of the counterweight 7, that is, a part corresponding to the left inclined surface 7C. This maintenance opening 7E is formed as a rectangular opening by an upper edge 7E1, a lower edge 7E2, an inner edge 7E3 and an outer edge 7E4. The lower edge 7E2 configures the lowest portion of the maintenance opening 7E. It is possible to close the maintenance opening 7E with an air-permeable maintenance cover 7F to be openable/closable.

As shown in FIG. 3, an engine 8 is located on the front side of the counterweight 7 and is provided on the rear side of the revolving frame 6. The engine 8 is mounted in a transversely installed state of extending in the left-right direction. A cooling fan 8A is provided on the left side that is one side in the left-right direction of the engine 8. This cooling fan 8A is adapted to suck external air as cooling air through respective external air inlet ports 22A1, 22A2 and the like in a left side surface cover part 22 of an exterior cover 21 that will be described later and to make it flow toward a heat exchanger 9 in an arrow A direction (see FIG. 5, FIG. 6) by rotating using the engine 8 as a power source. On the other hand, a hydraulic pump 16 that will be described later is attached to the right side of the engine 8. Further, an exhaust pipe 8B adapted to emit an exhaust gas is provided at a front-side position of the engine 8. The downstream side of this exhaust pipe 8B is connected to a first exhaust gas post-treatment device 20A of a post-treatment unit 20 that will be described later.

The heat exchanger 9 is located closer to the upstream side of a flowing direction of the cooling air than the cooling fan 8A of the engine 8 and is provided on the left rear side of the revolving frame 6 so as to face the cooling fan 8A. This heat exchanger 9 is adapted to cool various temperature-risen fluids with the cooling air. As shown in FIG. 3, the heat exchanger 9 is configured of including a frame body 10 that constitutes an outer frame, and a radiator 11, an oil cooler 12, an intercooler 13 and a condenser 14 of an air conditioner that constitute heat exchanging elements.

The frame body 10 forms the outer frame of the heat exchanger 9. This frame body 10 opens to the flowing direction (the arrow A direction) of the cooling air by the cooling fan 8A of the engine 8. That is, the heat exchanger 9 is disposed in such a manner that the front-rear direction of the upper revolving body 4 becomes a breadth direction thereof in the engine 8 that is mounted in the transversely installed state of extending in the left-right direction as in the present embodiment. This frame body 10 is formed having a square frame structure that is elongated in a upper-lower direction. The frame body 10 is fixedly attached onto, for example, the undercover 6J of the revolving frame 6 or a not shown frame. A fan shroud 10A is provided on the engine 8 side of the frame body 10 so as to surround the cooling fan 8A.

The radiator 11 is disposed on the rear-part right side (the counterweight 7 side) in the frame body 10. The radiator 11 is adapted to cool engine cooling water whose temperature rises by cooling the engine 8 and is connected to a water jacket (not shown) of the engine 8.

The oil cooler 12 is disposed side by side and in series therewith at a front-side position in the front-rear direction so as to be substantially flush with the radiator 11 at a front-side position of the radiator 11 in the frame body 10. The oil cooler 12 is adapted to cool a temperature-risen hydraulic oil and is connected to a control valve device (not shown), a hydraulic oil tank 17 and the like.

The intercooler 13 is provided on the opposite side of the cooling fan 8A with the radiator 11 and the oil cooler 12 being interposed. This intercooler 13 is adapted to cool pressurized air (suction air) that flows into it from a supercharger of the engine 8 and to make it flow out toward the suction side of the engine 8. Here, the intercooler 13 is disposed, for example, at a boundary position between the radiator 11 and the oil cooler 12 and is disposed so as to overlap the radiator 11 and the oil cooler 12.

The condenser 14 of the air conditioner is disposed at a lower-side position of the intercooler 13 so as to face the radiator 11 and the coil cooler 12. The condenser 14 is adapted to cool a cooling medium used in the air conditioner.

Here, as shown in FIG. 2, FIG. 4, a plurality of, for example, three dust protective nets 15 are provided on the heat exchanger 9 so as to cover the radiator 11, the oil cooler 12, the intercooler 13 and the condenser 14 of the air conditioner that are the heat exchanging elements from the upstream side of the flowing direction of the cooling air. The respective dust protective nets 15 are disposed on, for example, a front surface of the intercooler 13, a front surface of the condenser 14 and the upper side of the urea water tank 27 that will be described later (a position where it covers an almost upper half of the maintenance opening 7E in the counterweight 7). It is also possible to provide this dust protective net for every heat exchanging element. Further, it is also possible to form them using one dust protective net by performing folding thereon.

It is to be noted that an arrangement relation among the radiator 11, the oil cooler 12, the intercooler 13 and the condenser 14 is not limited to the above-described one and may be changed appropriately. In addition, it is also possible to apply a fuel cooler and the like that cools fuel as one of the heat exchanging elements.

The hydraulic pump 16 is attached to the right side of the engine 8. This hydraulic pump 16 is adapted to discharge the hydraulic oil that is supplied from the hydraulic oil tank 17 that will be described later toward a control valve device (not shown) as a pressure oil by being driven by the engine 8.

The hydraulic oil tank 17 is located on the revolving center O side on the front side of the hydraulic pump 16 and is provided on the revolving frame 6. This hydraulic oil tank 17 is adapted to store the hydraulic oil for driving respective actuators provided on the lower traveling body 2, the revolving device 3 and the front device 5.

The fuel tank 18 is provided on the revolving frame 6 so as to be arrayed on the right side that is the outer side in the left-right direction relative to the hydraulic oil tank 17. The fuel tank 18 is adapted to store the fuel to be supplied to the engine 8.

A cab 19 is mounted on the left front side of the revolving frame 6. The cab 19 is the one on which an operator will get and an operator's seat on which the operator will sit, an operation lever for traveling, an operation lever for work and the like (none of them is shown) are disposed therein.

Next, a configuration of the post-treatment unit 20 that is provided by connecting to the exhaust side of the engine 8 in order to treat the exhaust gas emitted from the engine 8 will be described.

The post-treatment unit 20 is located on the right side of the engine 8 and is provided on the upper side of the hydraulic pump 16. This post-treatment unit 20 is adapted to oxidize and remove carbon monoxide (CO), a hydrocarbon (HC) and the like contained in the exhaust gas emitted from the engine 8, to purify nitrogen oxides (NOx) contained in the exhaust gas and to further reduce noises of the exhaust gas.

The post-treatment unit 20 is configured of including the first exhaust gas post-treatment device 20A to the inflow side of which the exhaust pipe 8B of the engine 8 is connected, a connecting pipe 20B that is connected to the outflow side of the first exhaust gas post-treatment device 20A, a urea water injection valve 20C that is provided in the connecting pipe 20B and injects the urea water and a second exhaust gas post-treatment device 20D that is connected to the outflow side of the connecting pipe 20B.

An oxidation catalyst (not shown) is accommodated in the first exhaust gas post-treatment device 20A. This oxidation catalyst is the one that configures one of treatment members that purify the exhaust gas. The oxidation catalyst is adapted to oxidize and remove the carbon monoxide (CO), the hydrocarbon (HC) and the like contained in this exhaust gas by making the exhaust gas flow under a predetermined temperature.

The urea water injection valve 20C is connected to the urea water tank 27 that will be described later via a urea water line and a urea water pump (both of them are not shown). Then, the urea water injection valve 20C is adapted to inject a urea water solution toward the exhaust gas that flows in the connecting pipe 20B.

The second exhaust gas post-treatment device 20D is located on the upper side of the first exhaust gas post-treatment device 20A and is connected to the downstream side of the connecting pipe 20B. A urea water selective reduction catalyst, the oxidation catalyst and the like (none of them is shown) are accommodated in the second exhaust gas post-treatment device 20D. In addition, an exhaust port 20E is provided on a rear-side part located on the downstream side of the second exhaust gas post-treatment device 20D so as to project upward in a radius direction and the projected end side of this exhaust port 20E is connected to a tail pipe 25A of a top surface cover part 25 that will be described later.

The urea water selective reduction catalyst is adapted to make the nitrogen oxides (NOx) that are, in general, contained in the exhaust gas emitted from the engine 8 selectively undergo a reduction reaction with ammonia generated from the urea water solution and to decompose them into nitrogen and water. On the other hand, the oxidation catalyst is adapted to oxidize residual ammonia that remains after reducing the nitrogen oxides with the urea water selective reduction catalyst and to separate it into water and nitrogen.

Next, the exterior cover 21 that is located on the rear side of the upper revolving body 4 and covers the engine 8, the heat exchanger 9 and the like will be described.

As shown in FIG. 1, FIG. 2, the exterior cover 21 is disposed between the counterweight 7 and the cab 19 and is adapted to cover the engine 8, the heat exchanger 9, the hydraulic pump 16 and the like. This exterior cover 21 is configured of including the left side surface cover part 22, a right side surface cover part 24 and a top surface cover part 25 that will be described later.

The left side surface cover part 22 is disposed so as to face the heat exchanger 9 in the flowing direction of the cooling air. Specifically, the left side surface cover part 22 is located between the counterweight 7 and the cab 19 and is provided on the left side frame 6E of the revolving frame 6 so as to extend in the upper-lower direction. The left side surface cover part 22 is configured of a side door 22A that is formed into a rectangular shape over an intermediate part to the lower side in the upper-lower direction thereof and a left corner part 22B that is bent toward the heat exchanger 9 side while extending upward from an upper end of the side door 22A.

The side door 22A is attached to a column 23 (see FIG. 2, FIG. 4) the front side of which extends along a rear surface of the cab 19 in the upper-lower direction to be rotationally movable (openable/closable) in a horizontal direction. In addition, the side door 22A is equipped with the external air inlet ports 22A1, 22A2 adapted to make the external air flow in toward the heat exchanger 9 side (the arrow A direction in FIG. 5, FIG. 6). Also the left corner part 22B is equipped with external air inlet ports 22B1, 22B2 adapted to make the external air flow in toward the heat exchanger 9 side. Then, the left side surface cover part 22 configures a closing surface that closes the left side and part of the upper side of the heat exchanger upstream room 26 that will be described later.

The right side surface cover part 24 is located between the counterweight 7 and the fuel tank 18 and is provided on the right side frame 6F of the revolving frame 6 so as to extend in the upper-lower direction. The upper side of the right side surface cover part 24 is bent toward the hydraulic pump 16 side.

The top surface cover part 25 is adapted to cover the upper sides of the engine 8, the heat exchanger 9 and the like. This top surface cover part 25 is provided in a range surrounded by the left and right side surface cover parts 22, 24 and the counterweight 7. The tail pipe 25A is provided closely to the right side of the top surface cover part 25 and the exhaust port 20E in the post-treatment unit 20 is connected to this tail pipe 25A. A left-side part of the top surface cover part 25 configures a closing surface that closes part of the upper side of the heat exchanger upstream room 26.

Next, a configuration of the heat exchanger upstream room 26 in which the below described urea water tank 27 and the like are to be disposed will be described. Although a drawing that shows the heat exchanger upstream room 26 as a closed space is not present in the present embodiment, description will be made by assigning a reference numeral to a position where the heat exchanger upstream room 26 is to be formed.

The heat exchanger upstream room 26 is located on the left rear side of the upper revolving body 4 and is provided on the upstream side of the flowing direction of the cooling air relative to the heat exchanger 9. Specifically, the heat exchanger upstream room 26 is formed as a space that is surrounded by the undercover 6J of the revolving frame 6, the left inclined surface 7C of the counterweight 7, the heat exchanger 9 and the left side surface cover part 22 and the top surface cover part 25 that configure the exterior cover 21. The rear side of the heat exchanger upstream room 26 is formed as a triangular space efficient use of which is difficult by the left inclined surface 7C of the counterweight 7. The urea water tank 27 that will be described later is disposed on the rear side of the heat exchanger upstream room 26 by utilizing the triangular space.

Next, a configuration of the urea water tank 27 and a function brought about by that configuration that become characterizing portions of the present invention will be described.

Figure 6:
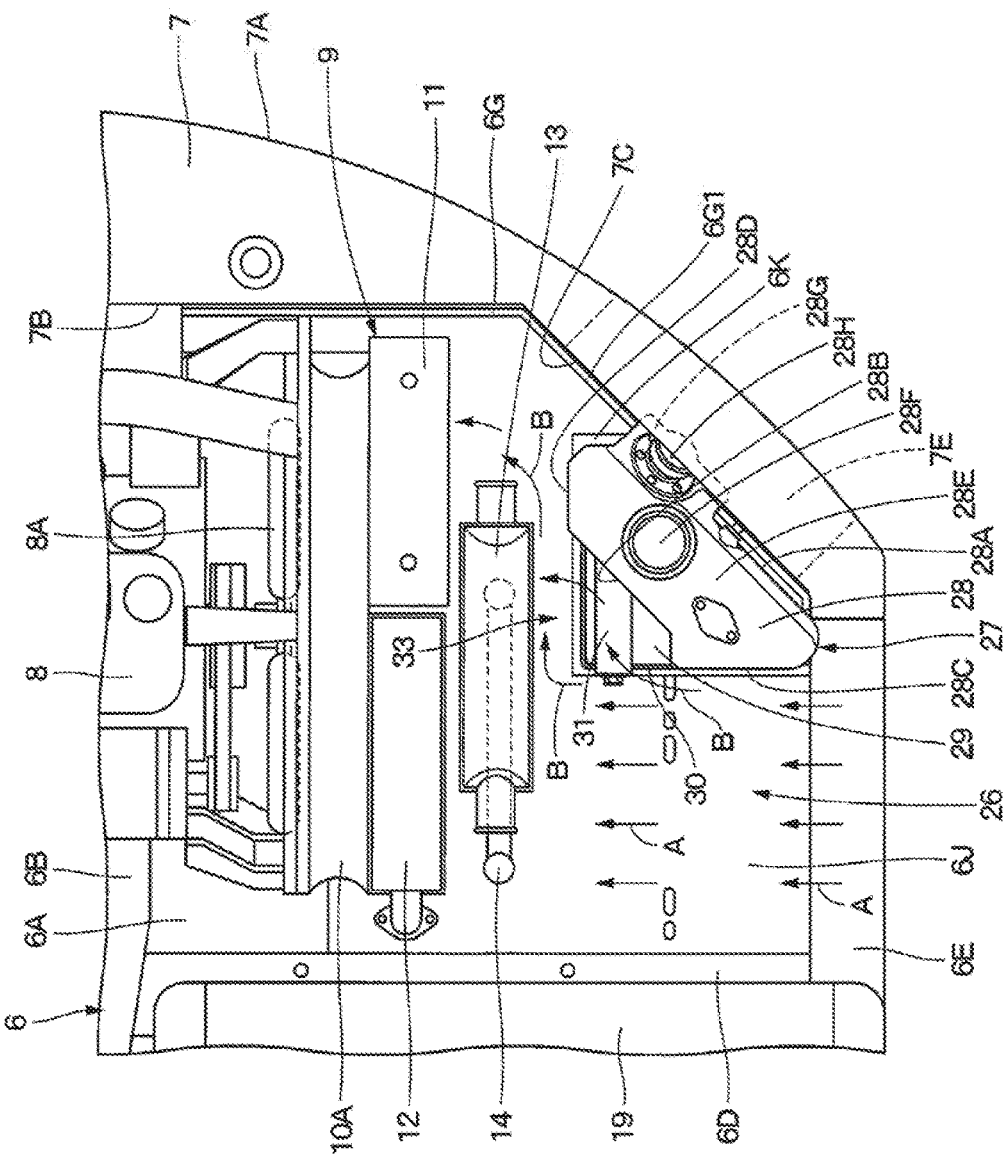
FIG. 6 is an essential part enlarged plan view showing the arrangement relation among the counterweight, the heat exchanger and the urea water tank together with the revolving frame.

The urea water tank 27 is provided to be located in the heat exchanger upstream room 26. The urea water tank 27 is adapted to store the urea water that is the reducing agent, is formed as a container made of, for example, a resin material and is connected to the urea water injection valve 20C in the post-treatment unit 20 via a urea water pump, a urea water line (both of them are not shown). Here, as shown in FIG. 5, FIG. 6, the urea water tank 27 is disposed at a position where it covers the front sides of the radiator 11 and the condenser 14 (the upstream side of the flowing direction of the cooling air). However, the urea water tank 27 according to the present embodiment is able to make the cooling air flow toward them by forming a cooling air guide passage 33 that will be described later between the radiator 11 and the condenser 14.

Figure 9:
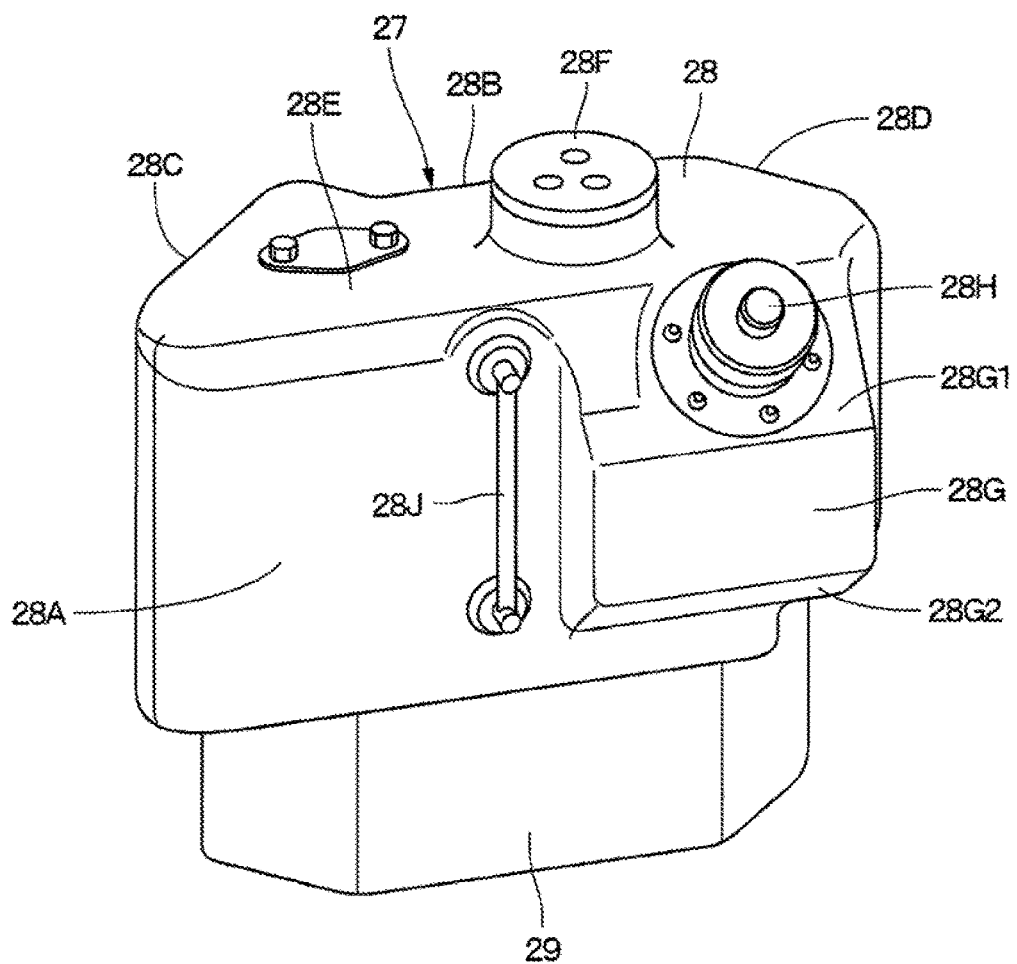
FIG. 9 is a perspective view showing the urea water tank seen from the rear inclined surface side.
Figure 10:
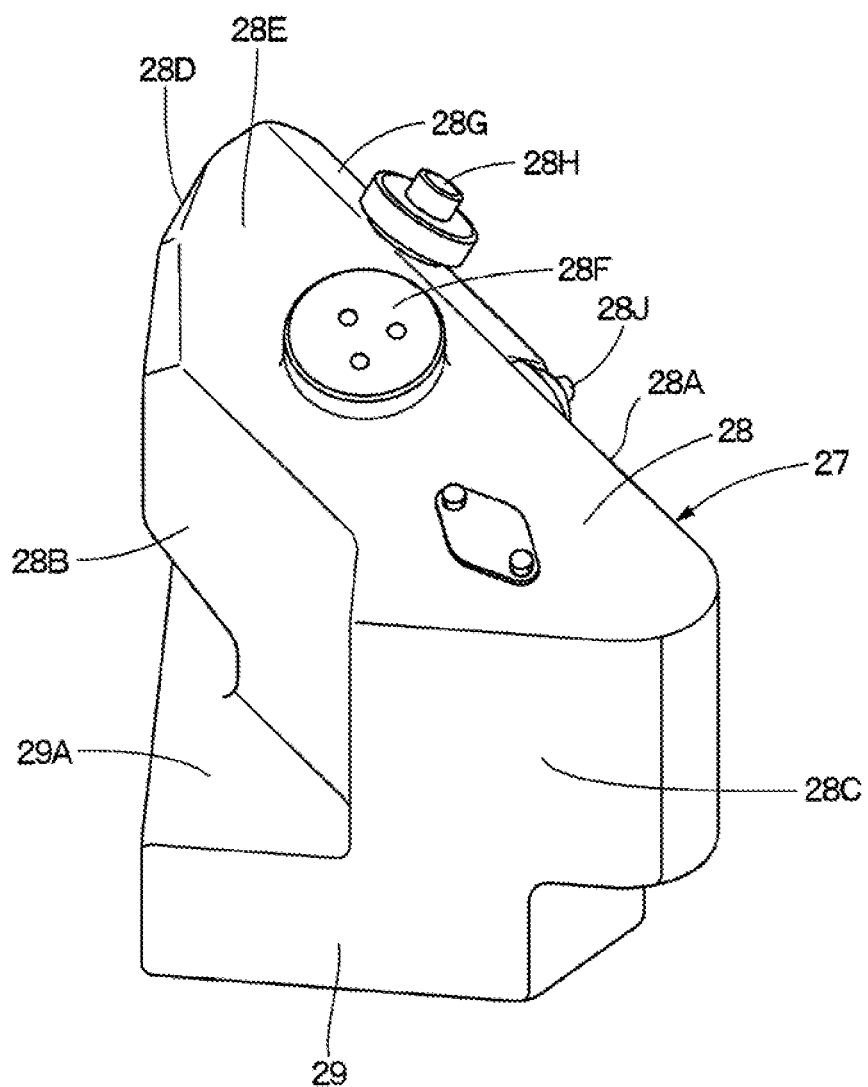
FIG. 10 is a perspective view showing the urea water tank seen from the front surface side.
Figure 11:
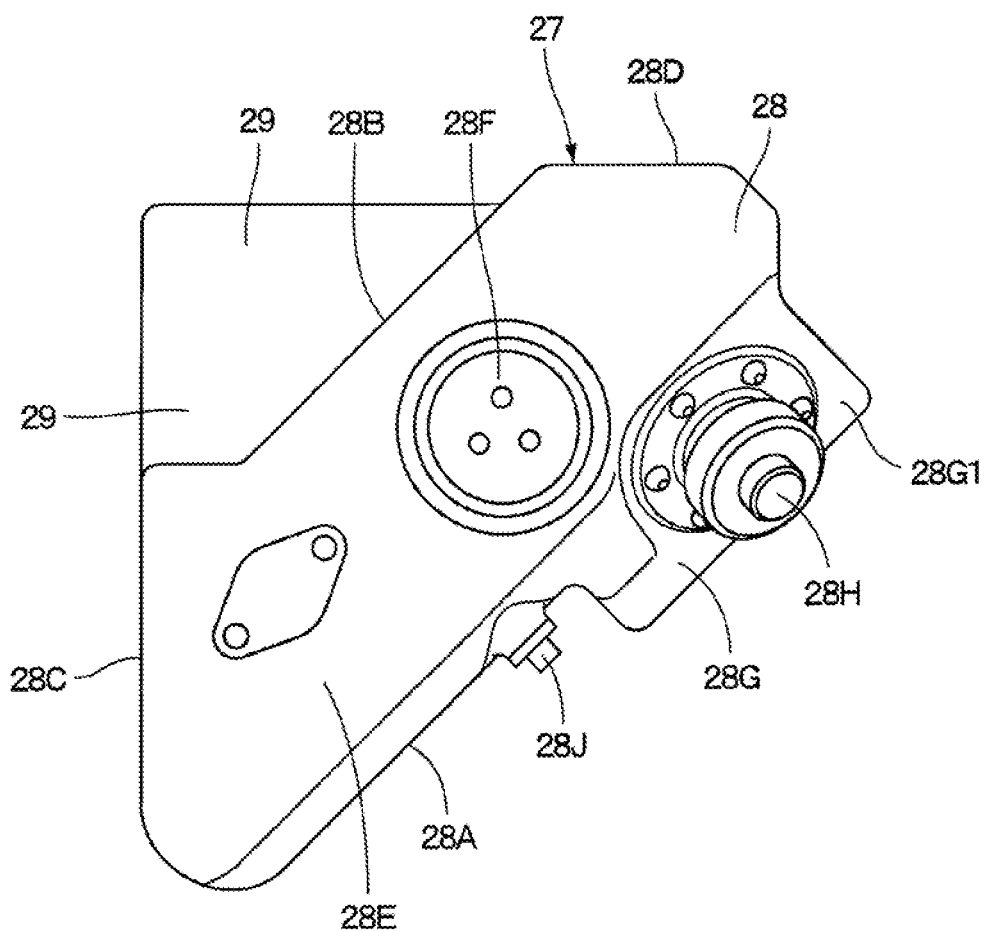
FIG. 11 is a plan view showing the urea water tank seen from the upper side.

As shown in FIG. 9 to FIG. 11, the urea water tank 27 is configured of an upper side tank part 28 having a large capacity and a lower side tank part 29 that is located on the lower side of this upper side tank part 28 and is formed to have a capacity that is smaller than that of the upper side tank part 28.

The upper side tank part 28 is formed as a box body including a rear inclined surface 28A that inclines so as to be parallel with the left inclined surface 7C of the counterweight 7 (the inclined part 6G1 of the left rear part beam 6G of the revolving frame 6), a front inclined surface 28B that inclines with a space being left apart from the rear inclined surface 28A and in substantially parallel with the rear inclined surface 28A, a front surface 28C that is formed on front ends of the rear inclined surface 28A and the front inclined surface 28B and is formed into a flat surface that is parallel with the left-right direction of the upper revolving body 4 (the flowing direction of the cooling air shown by the arrow A), a right surface 28D that is formed on rear ends of the front inclined surface 28A and the front inclined surface 28B and faces the radiator 11 and a top surface 28E that is provided on the rear inclined surface 28A, front inclined surface 28B, front surface 28C and right surface 28D.

A fitting hole 28F to which a supply line of the urea water, a return line thereof, lead lines and the like adapted to measure a temperature, a concentration and the like thereof (none them is no shown) are to be attached in inserted states is provided in the top surface 28E. Further, a projecting tank part 28G is provided on the rear inclined surface 28A so as to be located closer to the rear and a capped water supply port 28H is provided on the upper side of this projecting tank part 28G. It is to be noted that a level gage 28J that is located on the front side of the projecting tank part 28G and indicates a remaining amount of the urea water is provided on the rear inclined surface 28A.

As shown in FIG. 6, the rear inclined surface 28A of the upper side tank part 28 is disposed along and facing the left inclined surface 7C of the counterweight 7 and therefore it is possible to bring the upper side tank part 28 close to the counterweight 7. On the other hand, the right surface 28D of the upper side tank part 28 is formed so as to face the radiator 11 in substantially parallel therewith. Accordingly, since it is possible to form an acute angle between the rear inclined surface 28A and the right surface 28D, it is possible to dispose the upper side tank part 28 (the urea water tank 27) on a rear-most part of the heat exchanger upstream room 26 and it is possible to utilize the space of the heat exchanger upstream room 26 without waste.

The front inclined surface 28B of the upper side tank part 28 is disposed with a gap being left apart from and facing the heat exchanger 9. Thereby, the below-described cooling air guide passage 33 that makes the cooling air flow to rear side parts of the radiator 11 and the condenser 14 and the like is formed between the front inclined surface 28B, the right surface 28D, and the heat exchanger 9.

The front surface 28C of the upper side tank part 28 is formed as a flat surface that is parallel with the flowing direction of the cooling air. Therefore, the cooling air that flows into the heat exchanger upstream room 26 through the external air inlet ports 22A1, 22A2 and the like in the side door 22A that configures the left side surface cover part 22 of the exterior cover 21 is allowed to smoothly flow toward the arrow A direction along the front surface 28C and is efficiently supplied to the heat exchanger 9.

Further, the projecting tank part 28G of the upper side tank part 28 is formed so as to project into a trapezoidal form from the rear inclined surface 28A toward the counterweight 7. The projecting tank part 28G has the water supply port 28H is provided in an upper side inclined surface 28G1 that is located on the upper side. On the other hand, as shown in FIG. 8, a lower side inclined surface 28G2 on the lower side is disposed on the side above the lower edge 7E2 that constitutes the lowest portion of the maintenance opening 7E in the counterweight 7. Thereby, the projecting tank part 28G is allowed to project into the maintenance opening 7E and it is possible to increase its capacity by utilizing this maintenance opening 7E. Moreover, since the water supply port 28H is provided in the projecting tank part 28G that projects into the maintenance opening 7E, a worker is able to reach over to this water supply port 28H with ease and is able to perform urea water supply work readily and surely without spilling it to the surrounding.

The lower side tank part 29 is disposed at a position that is lower than those of the radiator 11 and the condenser 14 or at a position where an upper side part thereof slightly overlaps lower side parts of the radiator 11 and the condenser 14 in a state of being attached to the revolving frame 6 side. That is, the lower side tank part 29 is not disposed at a position where it would obstruct the flow of the cooling air. Accordingly, as shown in FIG. 10, FIG. 11, a right front part of the lower side tank part 29 is formed as a projecting part 29A that projects more than the front inclined surface 28B of the upper side tank part 28. This projecting part 29A constitutes a part on which a fixing band 31 is hanged when fixing the urea water tank 27 to the bracket 30 that will be described later.

An example of a procedure in a case of attaching the so configured urea water tank 27 to the revolving frame 6 will be described.

First, the box-shaped bracket 30 the upper side of which is opened is prepared. The lower side tank part 29 of the urea water tank 27 is put into this bracket 30. In this state, as shown in FIG. 8, the fixing band 31 is hanged on the projecting part 29A of the lower side tank part 29 and fastened with a nut 32 and thereby the urea water tank 27 is fixed to the bracket 30.

After fixing the urea water tank 27 to the bracket 30, this bracket 30 is bolted onto the tank mounting base 6K that is disposed on the undercover 6J of the revolving frame 6. Thereby, it is possible to locate the urea water tank 27 in the heat exchanger upstream room 26 and attach it to the revolving frame 6. The urea water tank 27 is spaced apart from the radiator 11, the condenser 14 and the like of the heat exchanger 9 by a predetermined dimension in this attached state and the cooling air guide passage 33 that will be described later is formed between it and them.

As shown in FIG. 5, FIG. 6, the cooling air guide passage 33 is provided between the heat exchanger 9 and the front inclined surface 28B of the upper side tank part 28 that configures the urea water tank 27. This cooling air guide passage 33 is adapted to make the cooling air flow by utilizing the gap between the heat exchanger 9 and the front inclined surface 28B. The cooling air guide passage 33 may largely open the cooling air inlet side thereof by the front inclined surface 28B of the upper side tank part 28 and therefore it is possible to positively guide the cooling air that flows from the outside into the heat exchanger upstream room 26 (the arrow A direction) through the respective external air inlet ports 22A1, 22A2 and the like in the left side surface cover part 22 (the side door 22A) toward the cooling air guide passage 33 side (an arrow B direction). Thereby, the cooling air guide passage 33 is allowed to guide the cooling air toward the radiator 11 and the condenser 14 that are disposed on parts in the vicinity of a front surface of the counterweight 7 that is located at an inner position sending of the cooling air to which is difficult in the heat exchanger 9 by the flow of the cooling air flow in the arrow B direction.

Figure 7:
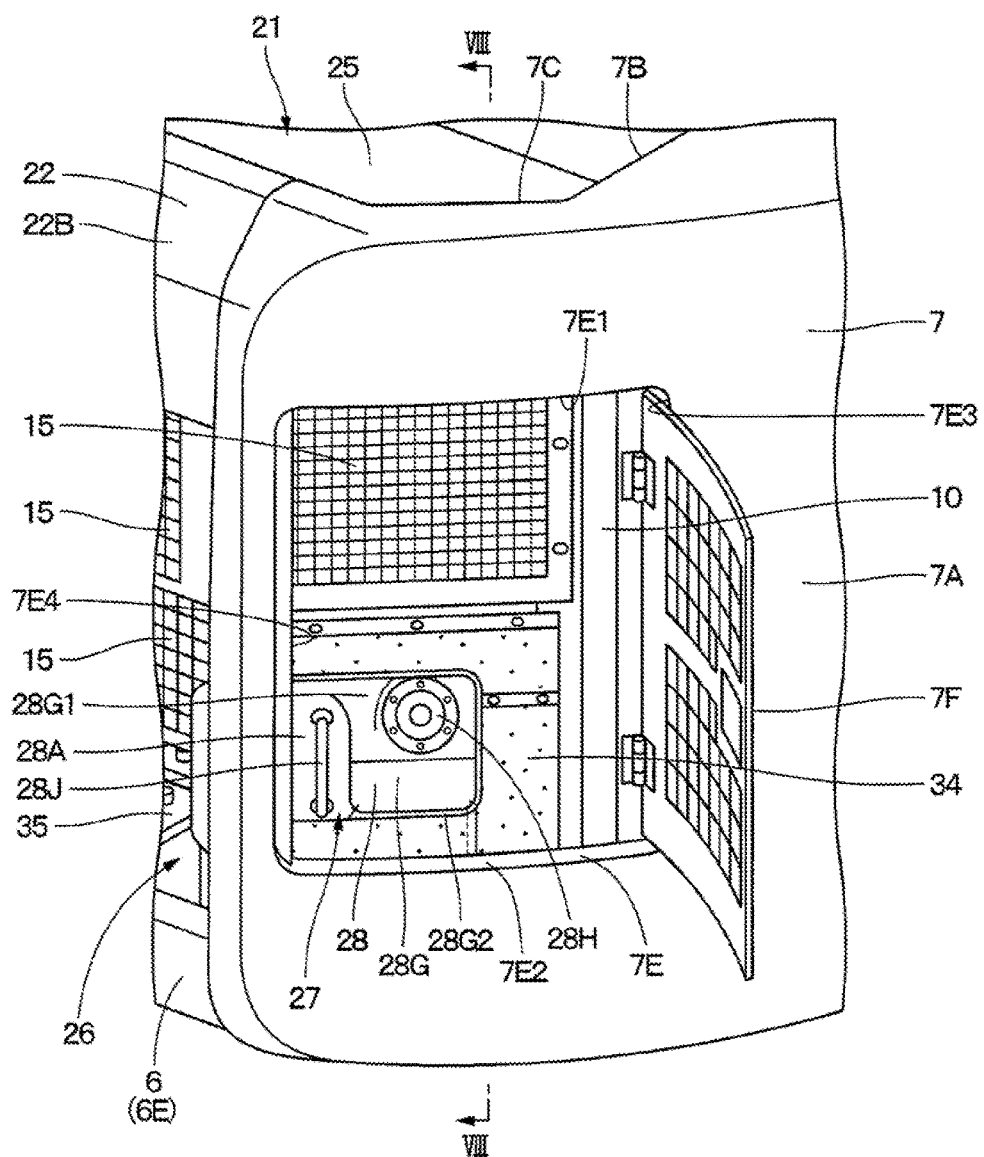
FIG. 7 is an essential part enlarged perspective view showing a surrounding part of a maintenance opening in FIG. 2 in a state where a maintenance cover is being opened.

A scatter prevention member 34 is provided around the water supply port 28H that is provided in the upper side tank part 28 of the urea water tank 27 (see FIG. 7, FIG. 8). This scatter prevention member 34 is adapted to prevent scattering (adhesion) of the corrosive urea water when supplying the urea water through the water supply port 28H. The scatter prevention member 34 is formed into an inverted C shape so as to surround the projecting tank part 28G of the upper side tank part 28, for example, by combining together a plurality of resin plates. Thereby, the scatter prevention member 34 is able to prevent a situation where surrounding members corrode with scattering of the urea water beforehand.

It is to be noted that a battery 35 is located in the heat exchanger upstream room 26 and is located on the front side of the urea water tank 27.

The hydraulic excavator 1 according to the present embodiment has the configuration as described above and next operations of the hydraulic excavator 1 will be described. The operator who gets on the cab 19 starts the engine 8 and drive the hydraulic pump 16. Thereby, the pressure oil from the hydraulic pump 16 is supplied to the various actuators via the control valve device. Thereby, when the operator operates the operation lever for traveling, he or she is able to move the lower traveling body 2 forward or backward. On the other hand, the operator is able to operate the revolving device 3 and the front device 5 so as to perform the earth and sand excavation work and the like by operating the operation lever for work.

The exhaust gas that is emitted from the engine 8 when the engine 8 is being operated is emitted into the atmosphere through the exhaust pipe 8B, the first exhaust gas post-treatment device 20A, the connecting pipe 20B, the second exhaust gas post-treatment device 20D. At this time, the oxidation catalyst that is provided in the first exhaust gas post-treatment device 20A oxidizes and removes the carbon monoxide (CO), the hydrocarbon (HC) and the like contained in the exhaust gas.

On the other hand, the urea water is injected from the urea water injection valve 20C toward the exhaust gas in the connecting pipe 20B and the nitrogen oxides are decomposed into nitrogen and water with the urea water selective reduction catalyst in the second exhaust gas post-treatment device 20D. Further, the oxidation catalyst oxidizes the residual ammonia, separates it into nitrogen and water and thereby emits the purified exhaust gas into the atmosphere.

Next, work in a case of supplying the urea water into the urea water tank 27 will be described. In this case, the worker opens the maintenance cover 7F of the counterweight 7 and exposes the urea water tank 27 through the maintenance opening 7E. In this state, the worker is able to supply the urea water through this water supply port 28H by uncapping the water supply port 28H in the upper side tank part 28.

Thus, according to the present embodiment, it has the heat exchanger upstream room 26 that is located on the upstream side of the cooling air flowing direction of the heat exchanger 9 and is surrounded by the revolving frame 6, the counterweight 7, the heat exchanger 9 and the exterior cover 21 and the urea water tank 27 that stores the urea water that is the reducing agent is provided in the heat exchanger upstream room 26.

On the other hand, the counterweight 7 has the left side in the left-right direction that is on the front surface side formed as the left inclined surface 7C that inclines toward the heat exchanger upstream room 26. The upper side tank part 28 of the urea water tank 27 is formed as a box body including the rear inclined surface 28A that inclines so as to be parallel with the left inclined surface 7C of the counterweight 7, the front inclined surface 28B that inclines with the space being left apart from the rear inclined surface 28A and substantially in parallel with the rear inclined surface 28A, and the front surface 28C that is formed on the front ends of the rear inclined surface 28A and the front inclined surface 28B and is formed into the flat surface that is parallel with the left-right direction of the upper revolving body 4. Thereby, the rear inclined surface 28A of the upper side tank part 28 is disposed along and facing the left inclined surface 7C of the counterweight 7 and the front inclined surface 28B of the upper side tank part 28 is disposed with the gap being left apart from and facing the heat exchanger 9.

After this, the cooling air guide passage 33 that makes the cooling air flow by utilizing the gap between the heat exchanger 9 and the front inclined surface 28B is formed between the heat exchanger 9 and the front inclined surface 28B of the upper side tank part 28 that configures the urea water tank 27.

Accordingly, as shown by the arrow A, part of the cooling air that flows in from the left side surface cover part 22 of the exterior cover 21 along the front surface 28C of the urea water tank 27 (the upper side tank part 28) flows toward the cooling air guide passage 33 as shown by the arrow B. This cooling air is guided toward the part in the vicinity of the front surface of the counterweight 7, that is, the part close to the rear sides of the radiator 11 and the condenser 14 in the heat exchanger 9 through the cooling air guide passage 33.

Consequently, it is possible to make the cooling air flow along the front surface 28C of the upper side tank part 28 and it is also possible to positively supply the cooling air to the radiator 11 and the condenser 14 through the cooling air guide passage 33 even in a case where the urea water tank 27 is disposed in the heat exchanger upstream room 26 that is located on the upstream side of the cooling air flowing direction of the heat exchanger 9. Thereby, it is possible to efficiently cool the various fluids by the heat exchanger 9.

The maintenance opening 7E that is opened outward is formed in the left inclined surface 7C of the counterweight 7 and the water supply port 28H adapted to supply the urea water to a part that confronts the maintenance opening 7E is provided in the upper side tank part 28 of the urea water tank 27. Thereby, it is possible to expose the urea water tank 27 through the maintenance opening 7E by opening the maintenance cover 7F of the counterweight 7 and it is possible to supply the urea water through this water supply port 28H with ease.

In addition, the projecting tank part 28G in which a part located on the side above the lower edge 7E2 that constitutes the lowest portion of the maintenance opening 7E in the counterweight 7 is projected into the maintenance opening 7E is provided on the rear inclined surface 28A of the upper side tank part 28 that configures the urea water tank 27. The water supply port 28H is provided in this projecting tank part 28G. Accordingly, the urea water tank 27 is allowed to increase its capacity by the amount obtained by a part provided by projecting the projecting tank part 28G on the upper side tank part 28 and it is possible to extend an operating time of the hydraulic excavator 1. Moreover, since the water supply port 28H is provided in the projecting tank part 28G that projects into the maintenance opening 7E, the worker is able to reach over to this water supply port 28H through the maintenance opening 7E with ease. Consequently, he is able to perform the urea water supply work readily and surely without spilling it to the surrounding.

Further, the scatter prevention member 34 adapted to prevent scattering of the urea water in water supply is provided around the water supply port 28H of the urea water tank 27. Thereby, the scatter prevention member 34 is able to prevent the situation where the surrounding members corrode with scattering of the urea water beforehand.

It is to be noted that a case where the urea water tank 27 is configured to be attached to the revolving frame 6 via the bracket 30 is exemplified in the embodiment. However, the present invention is not limited to this and may be configured to attach the urea water tank 27, for example, directly to the revolving frame 6 by eliminating the bracket 30.

A case where the urea water tank 27 is configured to be fixed to the bracket 30 by using the fixing band 31 is exemplified in the embodiment. However, the present invention is not limited to this and may be configured to fix the urea water tank 27 to the bracket 30, for example, by using other fixing means such as a screw member and the like.

Description is made in the embodiment by giving a case where only the oxidation catalyst is provided in the first exhaust gas post-treatment device 20A of the post-treatment unit 20 by way of example. However, the present invention is not limited to this and may be configured to provide a particulate matter removing filter (Diesel Particulate Filter, also abbreviated and called DPF) that is located on the downstream side of the oxidation catalyst, for example, in the first exhaust gas post-treatment device 20A.

Further, the description is made by giving the small-type hydraulic excavator 1 that is equipped with the crawler mounted type lower traveling body 2 by way of example as the construction machine in the embodiment. However, the present invention is not limited to this and may be also applied to, for example, a hydraulic excavator that is equipped with a wheel type lower traveling body. It is widely applicable also to other construction machines such as a hydraulic crane and the like other than that.

DESCRIPTION OF REFERENCE NUMERALS

1: Hydraulic excavator (Construction machine)
2: Lower traveling body
4: Upper revolving body
5: Front device
6: Revolving frame
7: Counterweight
7A: Outer peripheral surface
7C: Left inclined surface
7E: Maintenance opening
7E2: Lower edge (Lowest portion)
8: Engine
8A: Cooling fan
9: Heat exchanger
11: Radiator
12: Oil cooler
13: Intercooler
14: Condenser
21: Exterior cover
22: Left side surface cover part
22A: Side door
22A1, 22A2, 22B1, 22B2: External air inlet port
22B: Left corner part
25: Top surface cover part
26: Heat exchanger upstream room
27: Urea water tank
28: Upper side tank part
28A: Rear inclined surface
28B: Front inclined surface
28C: Front surface
28G: Projecting tank part
28H: Water supply port
29: Lower side tank part
33: Cooling air guide passage
34: Scatter prevention member
A, B: Cooling air flowing direction

The invention claimed is:

1. A construction machine comprising:
a self-propelled lower traveling body;
an upper revolving body mounted rotatably on said lower traveling body; and
a front device provided capable of moving upward/downward on said upper revolving body, wherein said upper revolving body including:

a revolving frame forming a support structure body;

a counterweight provided on a rear side of said revolving frame so as to extend in a left-right direction of said revolving frame and keeps weight balance with said front device;

an engine located on a front side of said counterweight and provided on said revolving frame in a horizontal position, extending in a left-right direction;

a cooling fan provided on one side in a left-right direction of said engine and suctioning an outside air as a cooling air by rotating with said engine as a power source;

a heat exchanger located closer to an upstream side in a flow direction of the cooling air than said cooling fan, provided by facing said cooling fan and cooling a fluid by the cooling air;

an exterior cover including a side surface cover part that faces said heat exchanger in the flowing direction of the cooling air and is equipped with external air inlet ports and a top surface cover part that covers the upper sides of said engine and said heat exchanger;

a heat exchanger upstream room located on the upstream side in the flowing direction of the cooling air of said heat exchanger and surrounded by said revolving frame, said counterweight, said heat exchanger, and said exterior cover; and a urea water tank that is provided so as to be located in said heat exchanger upstream room and stores urea water that is a reducing agent, characterized in that:

an inclined surface that inclines toward said heat exchanger upstream room is formed on a front surface side of said counterweight at least on one side in the left-right direction, said urea water tank is formed as a box body that includes a rear inclined surface that inclines so as to be parallel with said inclined surface of said counterweight, a front inclined surface that inclines with a space being left apart from said rear inclined surface and in substantially parallel with said rear inclined surface, and a front surface that is formed on front ends of said rear inclined surface and said front inclined surface and is formed into a flat surface that is parallel with the left-right direction of said upper revolving body, said rear inclined surface of said urea water tank is disposed along and facing said inclined surface of said counterweight, said front inclined surface of said urea water tank is disposed with a gap being left apart from and facing said heat exchanger, and a cooling air guide passage through which said cooling air flows is formed between said heat exchanger and said front inclined surface of said urea water tank by utilizing the gap between said heat exchanger and said front inclined surface.

2. The construction machine according to claim 1, wherein a maintenance opening that is opened outward is formed in said inclined surface of said counterweight, and a water supply port adapted to supply urea water to apart that confronts said maintenance opening is provided in said urea water tank.

3. The construction machine according to claim 2, wherein a projecting tank part in which a part above a lowest portion of said maintenance opening is projected into said maintenance opening is provided on said rear inclined surface of said urea water tank, and said water supply port is provided in said projecting tank part.

4. The construction machine according to claim 3, wherein a scatter prevention member adapted to prevent scattering of the urea water in water supply is provided around said water supply port.

5. The construction machine according to claim 3, wherein said heat exchanger is disposed so as to locate on the front surface side of said counterweight and includes a radiator that cools engine cooling water and an oil cooler that is disposed side by side and in series with said radiator at a front-side position in a front-rear direction and cools a hydraulic oil, and the cooling air that flows through said gap is supplied toward said radiator which is close to said counterweight.

* * * * *